UNITED STATES PATENT OFFICE.

AUGUST BAUER, OF PHILADELPHIA, PENNSYLVANIA.

IMPROVED LUBRICATING COMPOSITION.

Specification forming part of Letters Patent No. 38,459, dated May 12, 1863.

*To all whom it may concern:*

Be it known that I, AUGUST BAUER, of Philadelphia, in the county of Philadelphia and State of Pennsylvania, have invented a new mode of manufacturing an oily substance from coal-tar which is commonly called "Pitch," of which the following is a specification.

To enable others to make and use my invention, I will proceed to describe how said oily substance is manufactured.

I put pitch, as aforesaid, into a kettle hermetically closed and covered by a lid, except that a pipe leads from said lid into an iron box. By raising said pitch to a heat of 500° Fahrenheit the oily substance contained in said pitch dissolves into steam, which by means of the pipe aforesaid is led into the iron box hereinbefore described, where it settles in the form of a yellow grease, the iron box being filled with water. From this box said grease is transferred into another iron boiler, wherein it is mixed with glue-water, when a grease is produced which is better adapted for greasing wagons or machinery than any known to me.

What I claim as my invention is—

The lubricating compound or grease produced as hereinbefore stated.

AUGUST BAUER.

Witnesses:
    M. BAUER,
    A. J. REILLY.